Patented Mar. 17, 1942

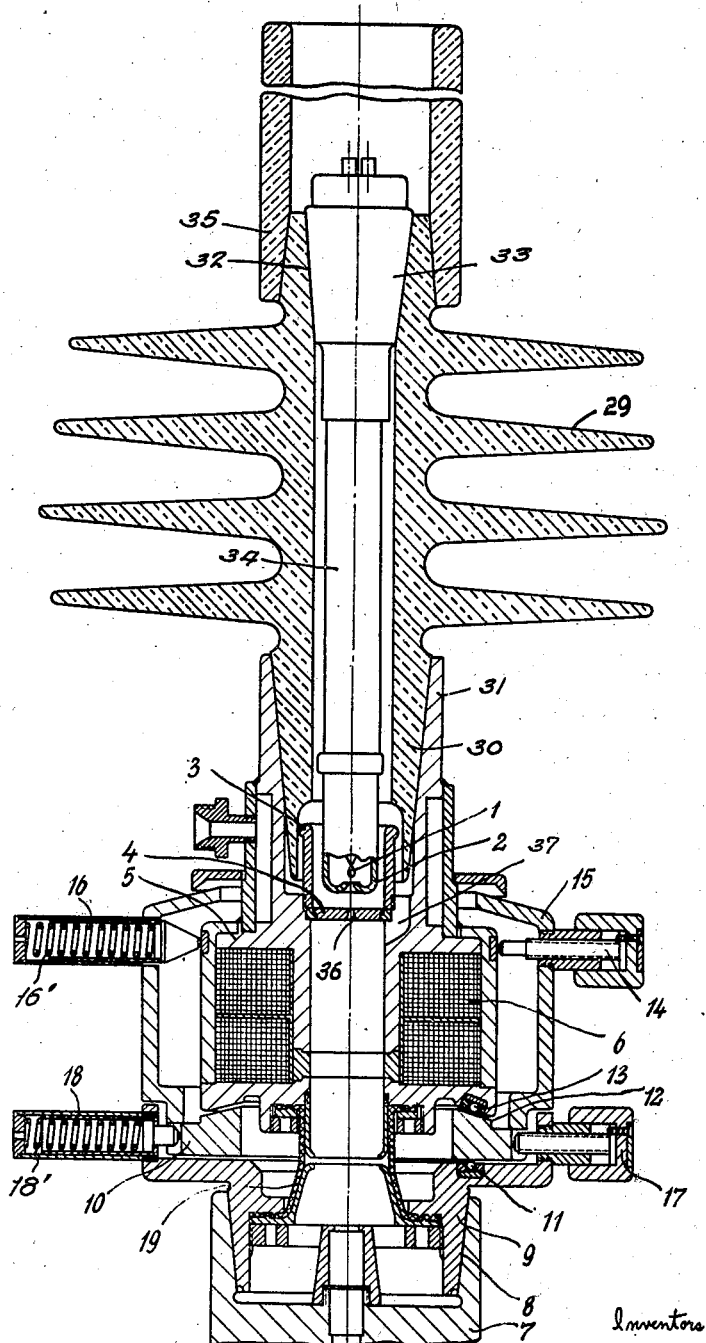

2,277,024

UNITED STATES PATENT OFFICE 2,277,024

ELECTRONIC MICROSCOPE

Ernst Ruska and Hans Schuchmann, Berlin-Spandau, Germany, assignors to Fides Gesellschaft für die Verwaltung und Verwertung von gewerblichen Schutzrechten mit beschränkter Haftung, Berlin, Germany, a corporation of Germany Application September 15, 1939, Serial No. 294,998
In Germany September 16, 1938

15 Claims. (Cl. 250—49.5)

This invention relates to an electronic microscope in which an irradiation apparatus produces a beam of electron rays which is converged towards the object by means of an electronic lens, for instance a magnet coil, and, after being modified by the object, is projected onto a screen or the like by means of one or more magnifying electronic lenses.

According to the invention a microscope arrangement of the above type is designed in such a manner that the irradiation apparatus can be shifted together with the condenser coil relatively to the object with the aid of adjusting means, which preferably permit the irradiation and coil unit to be displaced and tilted. The arrangement according to the invention has the advantage over the known microscope arrangements that the angle of incidence of the ray may be adjusted with respect to the object in such a manner as to enable a measurement thereof. Such an adjustment is important when producing high key images as regards the adjustment of the desired angle of reflection as well as when producing low key images. A particular advantage of the arrangement according to the invention consists also in the fact that the angle of incidence may easily be varied and thus the beam so directed as to pass through the middle, i. e. most favorable, range of the lens field, while the conditions under which the rays are produced, the focal length of the condenser lens, i. e. the ray intensity on the object are maintained constant.

The invention may be carried into practice by firmly securing the condenser lens to the irradiation apparatus and by providing these two parts with common adjusting means in such a manner that they can be tilted and transversely shifted relative to the direction of the electron beam. A simple adjusting device, for instance, may be obtained by arranging the condenser coil on a holder which may be shifted perpendicularly to the direction of the beam and which may be displaced relatively to the object carrier by means of set screws. By this simple adjusting device the beam may be displaced in parallel relation to its original position. To effect the angular displacement the holder may be provided with a spherical surface whose center lies in the object. This spherical surface then serves as a guide for the condenser lens and the irradiation apparatus assembled therewith and allows tilting this assemblage relative to the holder.

According to another aspect of the invention, the irradiation apparatus, forming the electron source of the electron microscope, is composed of component elements of such design as to permit separating these elements from one another, for instance for replacing the cathode proper, while ensuring and facilitating a correct optical centering of the component elements relative to one another and to the other parts of the microscope.

The accompanying drawing illustrates an embodiment of the invention and shows a vertical sectional view of the upper part of an electron microscope constructed as follows. The irradiation apparatus of the electronic microscope comprises the incandescent cathode 1, the Wehnelt cylinder 2, the anode 3 and the anode diaphragm 4. Cylinder 2 is disposed within the axial bore of an insulator 29 which is associated as shown in the drawing with the set off metal cylinder 5 of a magnet coil 6 serving as a condenser lens. Further details of the irradiation apparatus and its mounting will be described in a later paragraph. 7 denotes the upper part of the object carrier broken away. The inner conical wall 8 of part 7 is ground for the reception of the support 9 on which a holder 10, so arranged as to be movable relatively to the support 9, is supported by three ball bearings 11 spaced 120° from one another, of which only one is shown. The holder 10 has a spherical surface as indicated at 12 whose center lies in the object. The lower part of the condenser lens associated with the irradiation apparatus is supported through three ball bearings 13 on the spherical surface 12, also spaced 120° from one another. 14 designates set screws which are secured to an upwardly extending part 15 of the holder 10. Opposite to the set screws 14 are arranged sockets 16, each provided with a spring 16'. By adjusting the screws 14 the condenser lens 6 may be shifted together with the irradiation apparatus on the spherical surface 12. In this manner the angle under which the electronic ray impinges upon the object is varied. 17 denotes screws which are secured to the holder 9. Opposite to the screws 17 are sockets 18 each provided with a spring 18'. By adjusting the screws 17 the holder 10 may be shifted perpendicularly to the direction of the electron beam together with the condenser coil and the irradiation apparatus. By this adjustment it is possible to shift the beam in parallel relation to its original position. Set screws and sockets (not shown) corresponding to the screws 14, 17 and to the sockets 16, 18 are spaced 90° from one another. By these adjusting means it is therefore possible to shift within given limits the electron beam in parallel and angular relation to the magnifying objective lens system. The parts 9 and 6 of the arrangement which can carry out a motion relative to each other are surrounded by a rubber sleeve 19 to provide a seal for the vacuum chamber.

The elements forming the irradiation apparatus are designed and assembled as follows. The insulator 29, provided with exterior cooling ribs, has an outer conical sealing surface at its lower end 30 engaging an inner conical surface of the upper portion 31 of the metal cylinder 5. The upper end 32 of the insulator 29 has an inner conical sealing surface engaging a conical surface 33 of an elongated cylindrical cathode structure 34 carrying the elements 1 and 2 of the cathode proper. An insulating extension 35 is arranged on top of the insulator 29 also by means of a conical joint between these two parts. The outer cylindrical metal portion 31 of the composite anode structure thus forms the basis and support for the insulator and the cathode structure of the irradiation apparatus. The cylinders 3 and 31 of the cathode structure form an annular interstice free of electric fields. The lower ends of the insulator 29 terminates within the field-free space and is thereby protected from being damaged by flash-overs. The interior of the cathode structure 34 communicates through the central opening of its cylinder 2, and the opening 36 of the anode diaphragm 4 with the interior of the adjacent portion of the microscope. An additional passage 37 in the anode structure also establishes such a communication in order to facilitate the evacuation of the irradiation apparatus.

Due to the particular construction of the irradiation apparatus, its component elements can be separated from one another, for instance to effect repairs or replacements, and when assembled or reassembled assume automatically a centered and operative position relative to one another and to the adjoining lens portion of the microscope. It is, for instance, possible to replace a defective cathode structure by a new one within a minimum of time and without substantial difficulty in obtaining a correct optical alignment.

What is claimed is:

1. In an electron microscope having irradiation means for producing an electron beam, condenser lens means for concentrating said beam, a microscope structure containing object-holding means and a magnifying lens system, in combination, a holder of annular shape surrounding said beam and arranged between said structure and said condenser lens, said holder being displaceably mounted on said structure to be movable transversely with respect to the optical axis of said structure, means for adjusting the position of said displaceable holder relative to said structure, said irradiation means and said condenser lens means being connected with each other to form a single irradiation unit, said unit being tiltably mounted on said holder, and adjusting screws mounted on said holder and bearing against said unit for varying and securing the angular position of said unit relative to said holder.

2. In an electron microscope having a magnifying microscope portion and irradiating means for emitting an electron beam into said magnifying portion, said irradiating means comprising in combination a holder having a central bore forming a passage for said beam, a condensing lens mounted on said holder for producing a condensing lens field in said bore, an anode diaphragm mounted on said holder at the side of said condensing lens opposite said magnifying microscope portion, a cathode also mounted on said holder to emit electrons through said anode diaphragm into said bore, resilient sealing means vacuum-tightly connecting said holder with said microscope portion so as to permit angular and transversal displacements of said holder relative to said microscope portion, and separately adjustable mechanisms for adjusting said transversal and angular displacements respectively.

3. In an electron microscope having an electronic vacuum vessel composed of a magnifying portion and an irradiating portion, said irradiating portion containing an electron-emitting cathode and an anode in fixed spacial relation to each other, a resilient vaccum-tight member connecting said magnifying vessel portion with said irradiating vessel portion so as to permit displacements between said portions, and an adjusting mechanism disposed between said two vessel portions so as to form an adjustable rigid connection therebetween, said mechanism having a member slidably mounted on one of said vessel portions and connected with said other portion to permit shifting said portions relative to each other and transversely to the optical axis of the microscope, universal joint means disposed between said member and said other vessel portion to permit shifting said two vessel portions angularly with respect to each other, adjusting means associated with said member for varying the relative transversal position of said portions, and separate adjusting means associated with said universal joint for varying the relative angular position of said two portions.

4. In an apparatus for electron-optically examining objects, comprising an irradiating device for producing an electron beam, and a magnifying device having a lens system for causing said beam to produce a magnified image of the object, in combination, said irradiating device having a cathode and an anode and an electron-optical condenser lens connected with one another to form a single unit, universal joint means interposed between said irradiating device and said magnifying device to permit varying the angular position of said devices relative to each other while maintaining the position of said cathode, anode and condenser lens relative to one another, said universal joint means having two joint members angularly displaceable relative to each other, one of said joint members being firmly connected with one of said devices, said other joint member being in slidable engagement with said other device to permit transversal displacements of said devices relative to each other, adjusting means interconnecting said two members of said universal joint means for varying and fixing the relative angular position of said joint members, and other adjusting means interconnecting said slidable joint member and said other device for varying and fixing the relative transversal position of said two devices.

5. In an apparatus for electron-optically examining objects, comprising irradiating means for producing an electron beam, and a microscope structure having an electronic lens system for causing said beam to produce a magnified image of the object, in combination, said irradiating means having a cathode and an anode and an electron-optical condensing lens connected with one another in a fixed spacial relation to form a single unit, universal joint means interposed between said unit and said structure to permit varying the angular position of said unit relative to said vessel structure, and adjusting means connecting said unit with said structure for varying and fixing said angular position of said unit.

6. With an electron microscope structure containing a magnifying lens system and means for accommodating an object to be studied, in combination, a holder displaceably mounted on top of said structure so as to be movable transversely to the optical axis of said structure, an adjusting device having an adjusting screw disposed between said holder and said structure for adjusting the position of said holder relative to said structure, a second holder mounted on top of said first holder, said two holders forming a universal joint with each other to permit angular movements of said second holder relative to said first holder, an adjusting mechanism interconnecting said first holder and said second holder for adjusting the angular position of said holders relative to each other, a cathode and an anode for producing an electron beam, and an electronic lens for condensing said beam, said cathode, anode and condensing lens being mounted on said second holder in a fixed spacial relation to one another to form an irradiating unit tiltable as a whole relative to said first holder.

7. In an electron microscope having irradiating means for producing an electron beam, an electronic condenser lens for concentrating said beam towards an object to be studied, a microscope structure containing object-holding means and a magnifying lens system for causing the beam to produce a magnified image of the object, in combination, an annular holder surrounding said beam and arranged between said structure and said condenser lens, said holder being displaceably mounted on said structure to be movable transversely with respect to the optical axis of said structure and having a spherical upper surface whose geometrical center lies substantially in the plane of the object, adjusting means arranged between said structure and said displaceable holder for adjusting the position of said holder relative to said structure, said irradiating means and said condenser lens being connected with each other to form a unit, said unit being arranged on said spherical guiding surface of said holder so as to be tiltable relative to said holder, and adjusting means arranged between said unit and said holder for adjusting the angular position of said unit relative to said holder.

8. With an electron microscope structure containing a magnifying lens system and means for accommodating an object to be studied, in combination, a holder displaceably mounted on said structure so as to be movable transversely to the optical axis of said structure, adjusting means arranged between said holder and said structure for adjusting their position relative to each other, a second holder mounted on top of said first holder, said two holders forming together a universal joint to permit moving said second holder angularly relative to said first holder, said second holder having a central bore substantially coaxial to the optical axis, a resilient sleeve arranged between said second holder and said structure and forming a vacuum-tight communication between said bore and the interior of said structure, adjusting means arranged between said second holder and said first holder for adjusting the angular position of said holders relative to each other, a cathode and an anode for producing an electron beam, and an electronic lens for condensing said beam, said condensing lens being mounted on said second holder so as to surround said bore, and said cathode and anode being also mounted on said second holder to form together with said condensing lens a single unit tiltable as a whole relative to said first holder.

9. An electron microscope comprising an electronic vacuum device composed of a magnifying portion containing a magnifying lens system and means for accommodating an object to be studied, an irradiating portion, said irradiating portion separable as a unit from said magnifying portion and containing a cathode and an anode in fixed spacial relation to each other to emit an electron beam through the object and said lens system, a resilient vacuum-tight member disposed intermediate said irradiating portion and said magnifying portion and connecting said two device portions so as to permit said portions to be moved angularly and transversely with respect to each other without affecting the position of said cathode and anode relative to each other, and an adjusting mechanism interconnecting said two vessel portions exteriorly of said resilient member for varying and fixing the position of said portions relative to each other.

10. An electron microscope comprising an electronic vacuum device composed of a magnifying portion containing a magnifying lens system and means for accommodating an object to be studied, an irradiating portion containing a cathode and an anode to emit an electron beam towards the object and through said lens system, a movable vacuum-tight connection disposed intermediate said irradiating portion and said magnifying portion and connecting said two device portions so as to permit said portions to be moved angularly and transversely with respect to each other without affecting the position of said cathode and anode relative to each other, and an adjusting mechanism interconnecting said two vessel portions exteriorly of said resilient member for varying and fixing the position of said portions relative to each other.

11. An electron microscope comprising an electronic vacuum device composed of a magnifying portion containing a magnifying lens system and means for accommodating an object to be studied, an irradiating portion containing a cathode and an anode to emit an electron beam disposed intermediate said irradiating portion and said magnifying portion and connecting said two device portions so as to permit said portions to be moved angularly with respect to each other without affecting the position of said cathode and anode relative to each other, and an adjusting mechanism interconnecting said two vessel portions exteriorly of said resilient member for varying and fixing the position of said portions relative to each other.

12. An electron-emitting device for high DC operating voltages for electron-optical apparatus, comprising in combination a cathode structure of elongated cylindrical shape, an anode structure disposed coaxially with said cathode structure and connected with the adjoining portion of the apparatus to form the supporting base member of said device, and an insulator having a cylindrical bore and being detachably mounted on said anode structure, said cathode structure being detachably arranged in said cylindrical bore of said insulator, said insulator and said cathode structure having two coaxial and conical surfaces separably engaging each other to form a rigid and sealed joint, and said anode structure and said insulator having a second pair of coaxial and conical surfaces also in separable engagement with each other to form a rigid and sealed joint, whereby said cathode structure, anode structure and insulator, though detachable from one another, are firmly secured together to form a unit having said cathode and anode structures substantially in electron-optical alignment with each other.

13. With an electron-optical apparatus having a vacuum vessel, in combination, an electron-emitting device for high operating voltages comprising an elongated cathode structure having at one end a cathode proper and at the other end a conical sealing surface, a hollow insulator concentrically enclosing said cathode structure and having outer ribs for high voltage protection, said insulator having an elongated axial bore containing said cathode structure and two conical surfaces arranged at both ends respectively of said bore and coaxial to said bore, one of said latter surfaces being in separable engagement with said conical surface of said cathode structure, an anode structure connected with the adjoining portion of said vacuum vessel of the electron-optical apparatus so as to form a supporting base for said insulator and cathode structure, said anode structure having two concentric cylinders projecting towards said cathode structure, the inner cylinder being arranged adjacent to said cathode proper to coact electrically therewith, and the outer anode cylinder having a conical inner surface separably engaging said other conical surface of said insulator, whereby said anode structure, insulator and cathode structure, though detachable from one another, are firmly secured together coaxial to the optical axis of said vessel of the apparatus.

14. With an electron-optical apparatus having a vacuum vessel, in combination, an electron-emitting device for high D. C. voltages comprising an elongated cathode structure having at its emitting end a hot cathode proper and at the other end a conical sealing surface, a hollow high-voltage insulator surrounding said cathode structure coaxially and having two conical sealing surfaces at both ends respectively, one of said latter surfaces being in separable engagement with said conical surface of said cathode structure, an anode structure connected with the adjoining portion of said vacuum vessel of the electron-optical apparatus and forming a supporting base for said insulator and cathode structure, said anode structure having two concentric cylinders projecting towards said cathode structure to form an annular field-free space between said two cylinders, the inner cylinder being arranged between said electron-emitting end of said cathode structure and the corresponding end of said insulator, and the outer cylinder surrounding said end of said insulator and having a conical inner surface separably engaging said other conical surface of said insulator.

15. With an electron-optical apparatus having a vacuum vessel, in combination, an electron-emitting cathode structure for high D. C. voltages having an elongated tubular casing perforated at the electron-emitting end of the structure so as to have the interior of said casing communicate with the surrounding space, a hollow high-voltage insulator coaxially surrounding said cathode structure, an anode structure connected with said vacuum vessel and forming a supporting base for said insulator and cathode structure, said anode structure having two concentric cylinders projecting towards said cathode structure whereby an annular field-free space is provided between said two cylinders, the inner cylinder being arranged close to said perforated end of said casing to electrically cooperate with said cathode structure, said cathode structure and insulator forming together a separable sealed joint, said insulator and cathode structure forming together a second separable sealed joint so as to vacuum-tightly enclose said cathode structure and said space between said anode cylinders, and said anode structure having a passage opening into said space and communicating with the interior of said vacuum vessel of the electron-optical apparatus so that the interior of said cathode structure is in communication with said vessel through the perforation of said tubular casing, said field-free space between said anode cylinders and said passage.

ERNST RUSKA.
HANS SCHUCHMANN.